Figure 6:
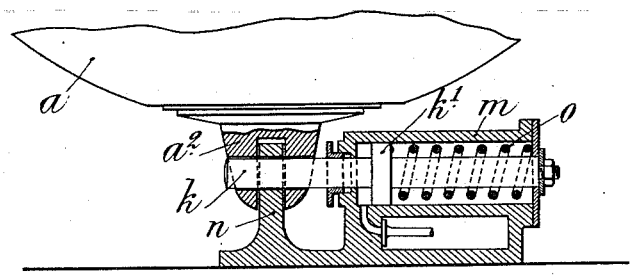

C. P. J. CARTERON.
SUBMARINE MINE.
APPLICATION FILED APR. 11, 1912.
1,039,254.
Patented Sept. 24, 1912.
7 SHEETS—SHEET 1.
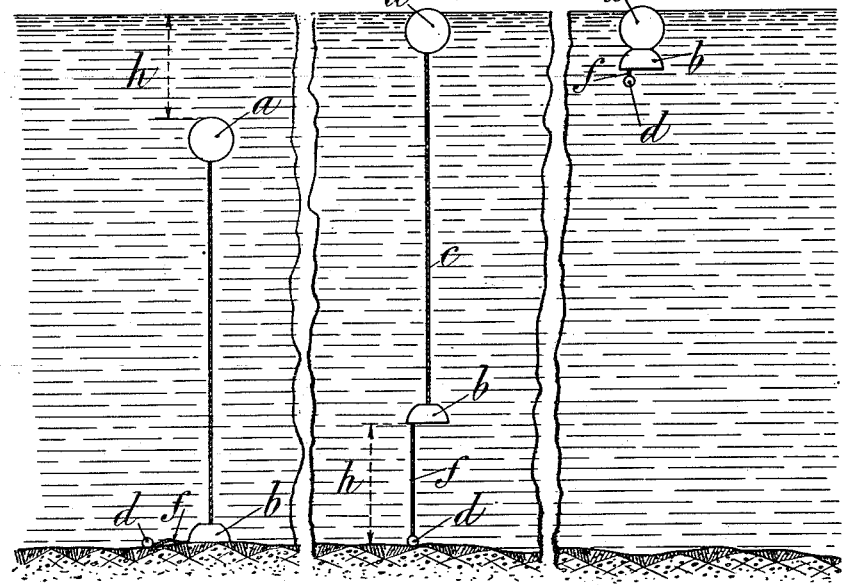

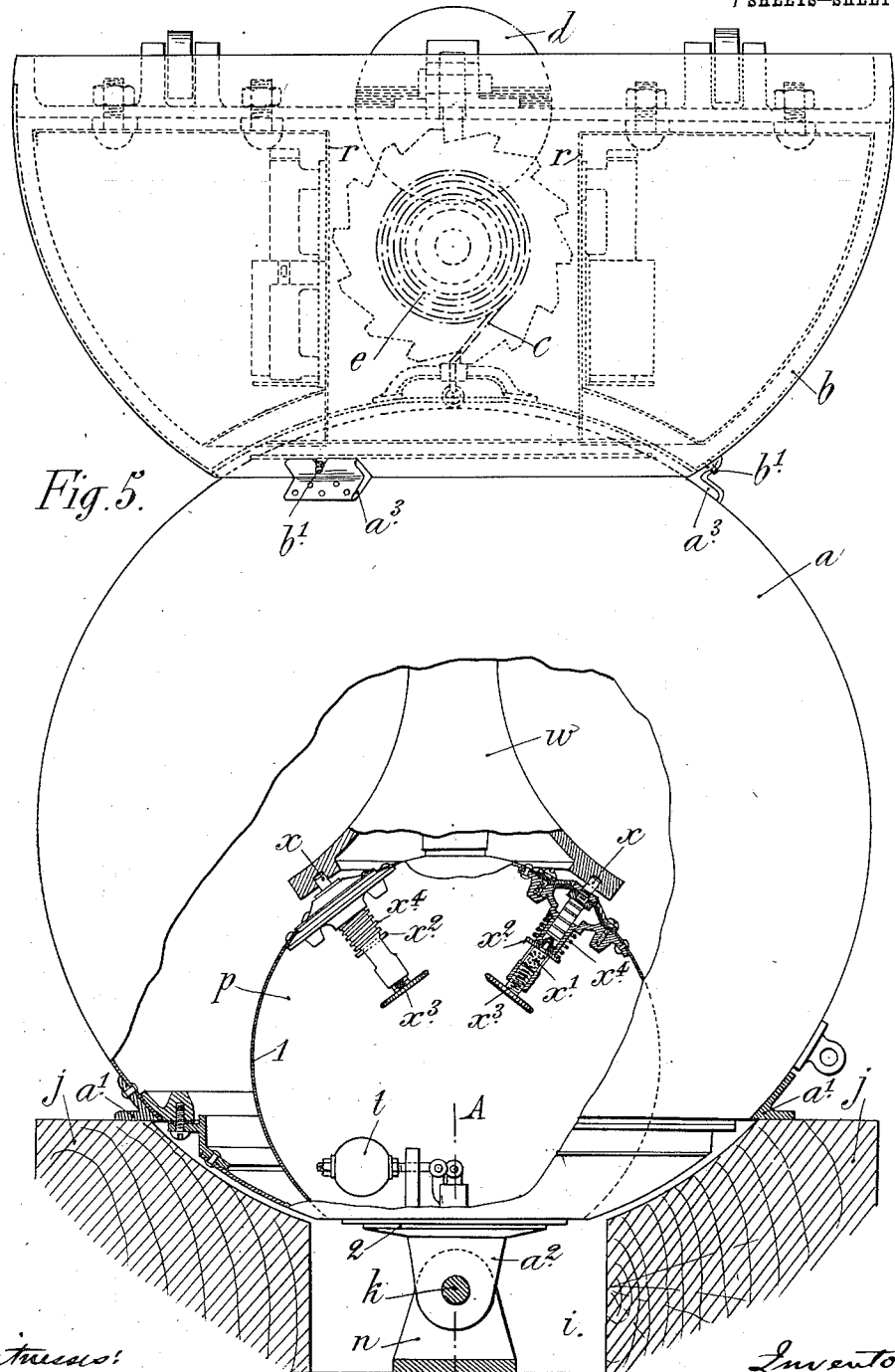

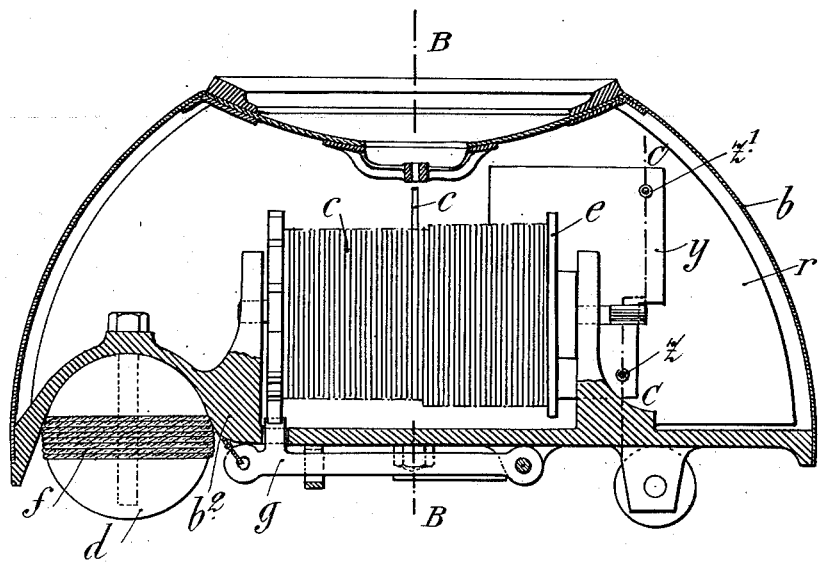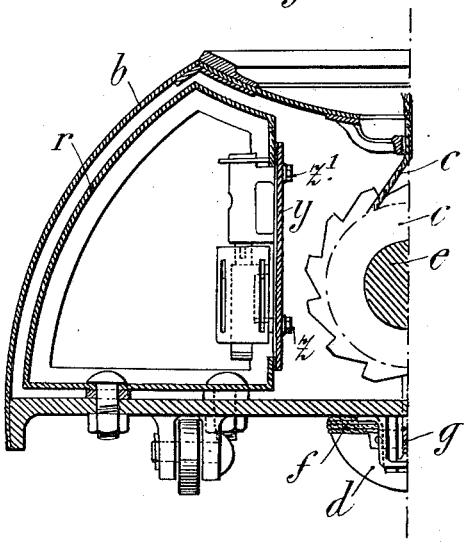

C. P. J. CARTERON.
SUBMARINE MINE.
APPLICATION FILED APR. 11, 1912.

1,039,254.

Patented Sept. 24, 1912.
7 SHEETS—SHEET 6.

C. P. J. CARTERON.
SUBMARINE MINE.
APPLICATION FILED APR. 11, 1912.

1,039,254.

Patented Sept. 24, 1912.

7 SHEETS—SHEET 7.

Witnesses:
Jas. H. Anderson
Ruth C. Fitzhugh

Inventor:
Charles Pierre Jules Carteron
by Mauro. Cameron. Lewis & Massie
Attys.

UNITED STATES PATENT OFFICE.

CHARLES PIERRE JULES CARTERON, OF SEVRAN-LIVRY, FRANCE.

SUBMARINE MINE.

1,039,254.  Specification of Letters Patent.  Patented Sept. 24, 1912.

Application filed April 11, 1912. Serial No. 689,955.

*To all whom it may concern:*

Be it known that I, CHARLES PIERRE JULES CARTERON, of Sevran-Livry, Seine-et-Oise, France, have invented a new and useful Submarine Mine, which is fully set forth in the following specification.

Hitherto, in order to submerge a submarine mine to a given depth "$h$", the mine has been constituted by two elements as shown diagrammatically in Figures 1 to 3 of the accompanying drawing. These elements comprise a float $a$ carrying the charge and the firing members, and an anchor $b$ adapted to separate from the float by the unwinding of a cable or rope $c$, the said anchor $b$ being provided with a sounding weight $d$ regulating the depth of immersion with which object it is connected with the body of the anchor by a wire $f$ having a length equivalent to "$h$" equal to the depth of immersion to be reached. At the time of immersion, in the position shown in Fig. 1, the float $a$ and the anchor $b$ are separated under the action of the weight $d$; in its descent the weight $d$ carries with it the anchor $b$ which it precedes by the interval "$h$." The anchor in descending unwinds the cable $c$ while the float $a$ remains on the surface. When the weight $d$ reaches the bottom the parts occupy the position shown in Fig. 2. At this moment the effect of the weight $d$ being eliminated a clutch which was dependent upon this weight acts and prevents any subsequent unwinding of the cable $c$. The weight of the anchor $b$ and the pressure of the water upon it are then exerted integrally upon the anchor and upon the float $a$ until the anchor itself touches the bottom. The elements of the mine then occupy the position shown in Fig. 3. This known method of mooring the great advantage of which is to insure an absolutely exact depth of immersion therefore implies the maintenance of the mine and of the float on the surface of the water for a certain time. Consequently it has hitherto been impossible to carry it into practice with submarine or submersible vessels. Attempts have been made to moor mines conveyed on such vessels and for this purpose they have been arranged in a chamber from which by actuating a bolt inside the vessel they could be lowered. As, however, at the moment of mooring the ship will be submerged to a variable depth, the depth of immersion of the mine itself becomes a function of this variable depth and consequently can never be given a predetermined value.

The present invention has for its object a method of and means for mooring submarine mines from a submerged submersible boat in such a manner that the mooring can be effected at a given depth irrespective of the depth of immersion of the boat at the moment of mooring.

The improved method consists broadly in fitting and fixing on the deck of the submersible as shown diagrammatically in Fig. 4 the mines formed of the known elements aforementioned (float, anchor, regulating weight, etc.) and in then, after releasing the locking device, automatically despatching the apparatus as a whole to the surface in order that the mine thus abandoned to itself may be able when it has assumed the position shown in Fig. 1 to moor itself at the desired depth precisely as if it had been moored from the surface.

In order to carry this novel method into practice in accordance with the invention the mine is despatched to the surface by the following simple means: The apparatus as a whole is installed upon the deck of the submersible as shown in Fig. 4 in such a manner as to present its two main elements (the float $a$ and anchor $b$ carrying the regulating weight $d$) in the inverse position to that which they occupy when the mine is submerged, that is to say the float $a$ is arranged below and supports the anchor $b$. In this position the whole will present a positive floatability which will tend to raise it to the surface; furthermore its center of gravity will be located above the center of thrust in such a manner that when abandoned to itself at a certain depth the apparatus will rise immediately rocking in such a manner that the elements resume their usual relative position. Finally, a device for automatically admitting water into chambers provided for this purpose in the float and in the anchor cause the mine after its inversion to present a total negative floatability thereby again imparting to it the conditions ordinarily obtaining in apparatus of this kind while at the same time the firing device is released. In a practical embodiment of the invention these several operations are retarded by appropriate means to enable the submersible to withdraw from the zone of the movements of the mine elements.

Figure 7:
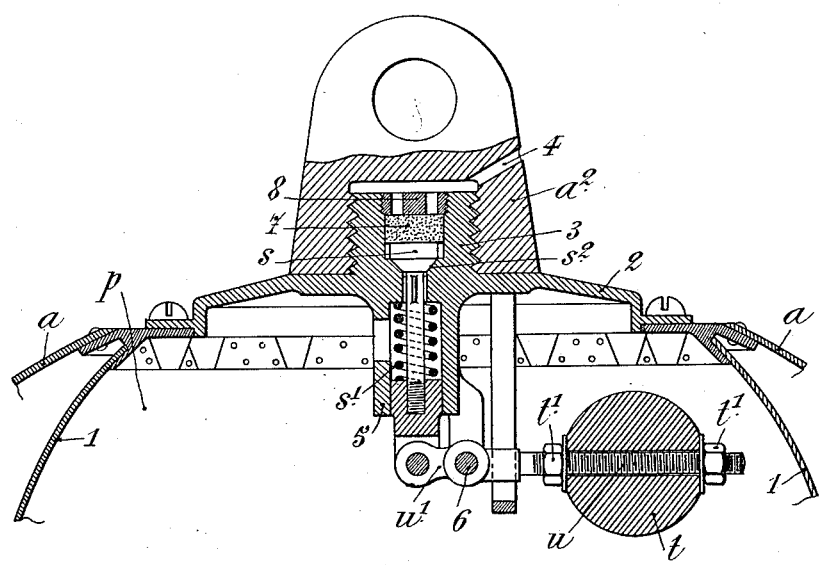
Figure 10:
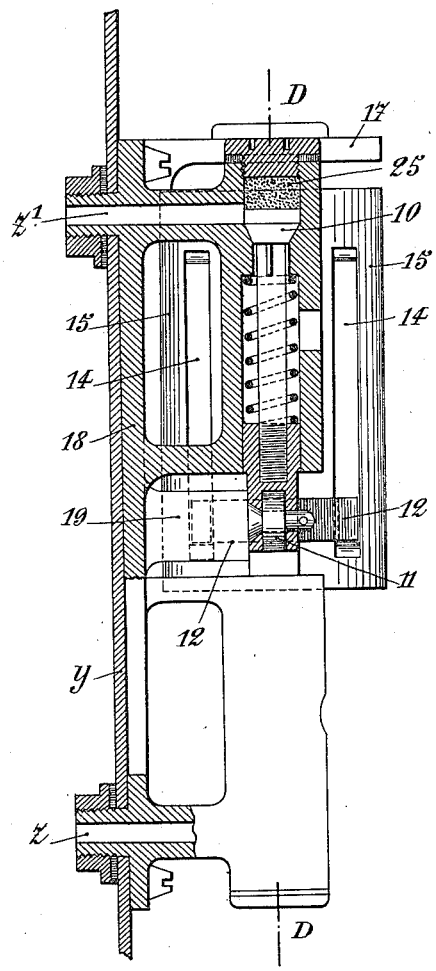
Figure 11:
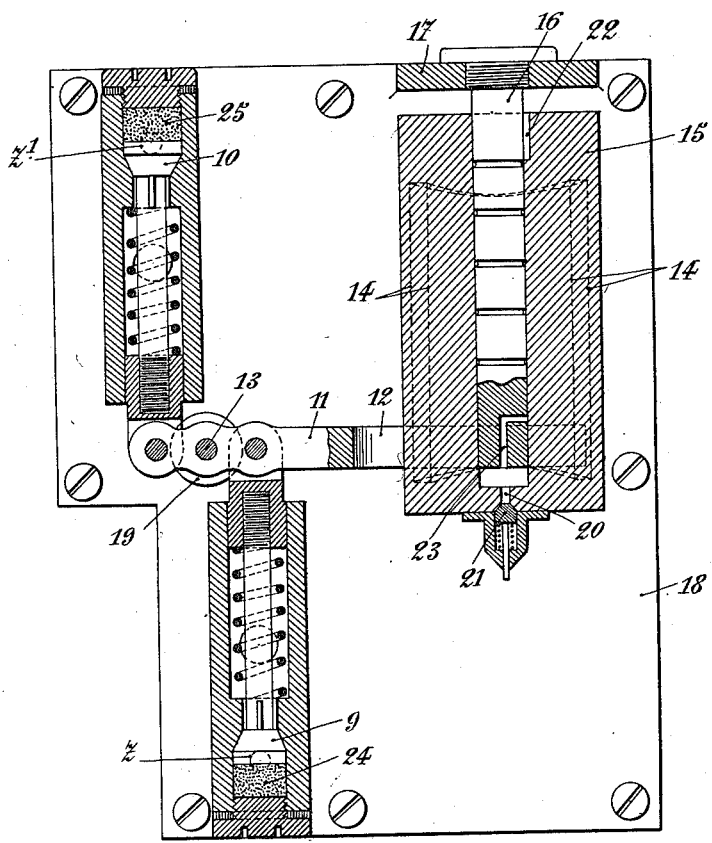
Figure 12:
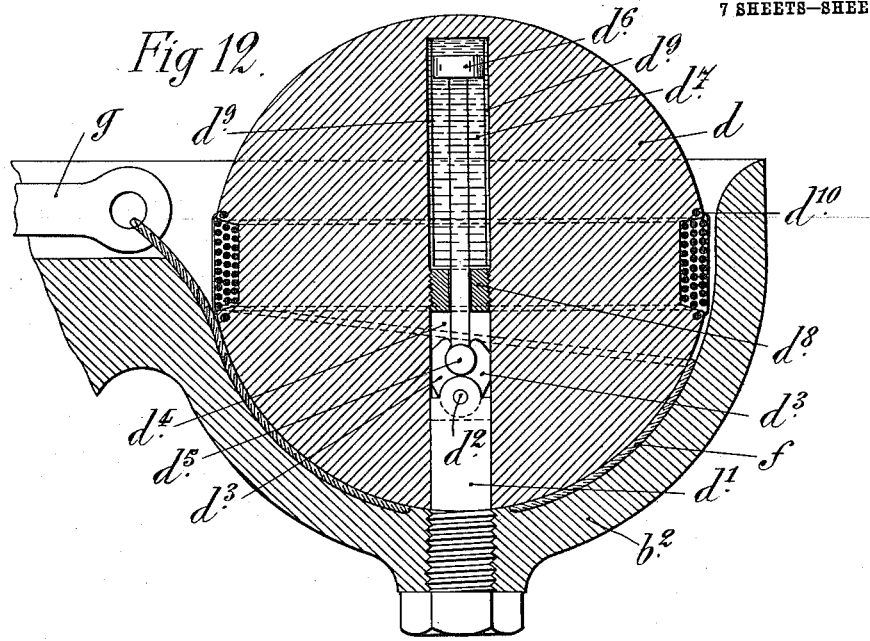
Figure 13:
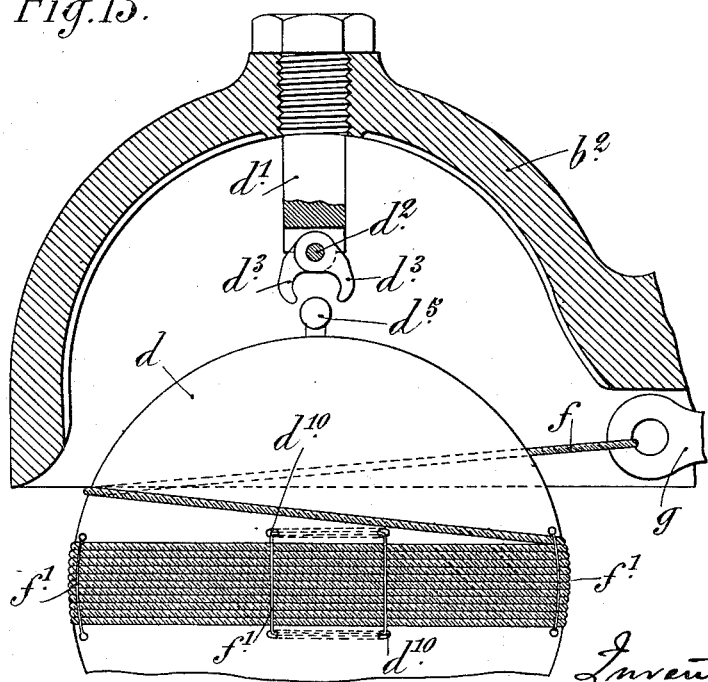

An embodiment of the invention is illustrated by way of example in the accompanying drawing, in which:

Fig. 5 is a general elevation of the mine in the position in which it is fixed upon the submersible vessel, certain parts being broken away. Fig. 6 is a partial cross section on the line A—A in Fig. 5 showing the means for locking the float on the submersible vessel. Fig. 7 is a section to a larger scale of the portion of the float $a$ which occupies the upper position after the inversion. Fig. 8 is a longitudinal section on the axis of the anchor viewed in the normal position that it assumes for the immersion after inversion of the mine as a whole. Fig. 9 is a semi-section on the line B—B of Fig. 8. Figs. 10 and 11 are detail sections to a larger scale of the compartments provided in the anchor for the automatic admission of water after the inversion of the mine. Fig. 10 being a cross section on the line C—C of Fig. 8 and Fig. 11 a section on the line D—D of Fig. 10. Figs. 12 and 13 show to a larger scale in two axial sections at right angles to each other the regulating immersion weight. Fig. 12 shows the weight in its normal position when the mine is fixed to the submersible and Fig. 13 shows it detached after the inversion of the mine.

As previously mentioned the mine comprises the usual elements, that is to say a float $a$ constituting the mine proper; an anchor $b$ and a weight $d$ for regulating the immersion; the float is connected in the known manner with the anchor by a rope $c$ of steel wire wound on a winch $e$ carried by the anchor; the unwinding of the rope $c$ takes place under the influence of the weight $d$ which for this purpose is connected by a line or cable $f$ with a locking lever $g$ (Fig. 8). The line $f$ has a length "$h$" equal to the depth of immersion to be attained.

In accordance with the invention the mine is installed upon the deck of the submersible vessel in the reverse position from that which it assumes on mooring. In other words prior to the mooring as shown in Figs. 4 and 5 the float $a$ occupies the lower position and supports the anchor $b$ provided with the winch $e$ and the regulating weight $d$.

In the example illustrated the float is partially engaged in recesses $i$ of appropriate form on the frame $j$ on which it is suspended by lugs $a'$ which prevent it from rocking. A bolt $k$ (Figs. 5 and 6) locks the float by means of a fork $a^2$ upon a lug $n$ on the submersible vessel. The bolt can be actuated from inside the vessel for the purpose of releasing it. With this object it may be movable in a cylinder $m$ and on one of the faces of a shoulder $k'$ forming a piston it may be subjected to the action of compressed air acting in opposition to a spring $o$ resting on the other face of the piston and on the cylinder end.

The anchor $b$ rests by means of projecting pins $b'$ for example (Fig. 5) in recesses formed in lugs $a^3$ on the float thereby completely preventing its transverse displacement or rotation relatively to the float, its retention being also due to the tension of the rope $c$.

In order that the apparatus as a whole may have a positive floatability until it becomes inverted at the moment of immersion a chamber $p$ is provided in the float $a$ and two reservoirs are provided in the anchor $b$; these chambers remain empty of water in the position shown in Fig. 5 being closed by a counter-weighted obturator which opens automatically when the mine is inverted.

In the construction illustrated the chamber $p$ or auxiliary reservoir of the float, comprises a casing 1 completely closed toward the interior of the mine and receiving externally a bronze cap 2. This cap (Fig. 7) in which the water inlet passage is formed can also receive on the external thread of a projection 3 the fork $a^2$ for bolting the mine to the deck; in this case a water inlet passage 4 is provided in the fork. The sleeve 3 and a sleeve 5 formed in alinement therewith internally projecting on the cap 2 form a housing and guide for the obturating member such as a valve $s$ adapted to open outward. On the one hand this valve is subjected to the action of a spring $s'$ which tends to hold it applied to its seat and on the other hand to the action of a weight $t$ carried by one of the branches $u$ of a lever $u$ $u'$ pivoted on a pivot 6 carried by the sleeve 5; the branch $u'$ of this lever is pivoted to the stem of the valve.

When the mine is bolted to the deck as shown in Fig. 5 the effect of the weight $t$ is added to that of the spring and to the water pressure for keeping the valve closed. When, however, the mine becomes inverted in mooring it the weight $t$ (the position of which can be regulated upon the threaded rod $u$ by means of nuts $t'$) acts oppositely to the spring, the tension of which it overcomes and enables the valve $s$ to open.

By means of a block of salt 7 inserted between a perforated plug 8 and the valve $s$ the valve can be prevented from rising during the manipulations of the mine in the air even when the anchor is lowermost; in this manner useless hammering of the valve is avoided and foreign bodies are excluded from the auxiliary reservoir $p$ of the float. This reservoir $p$ which is obturated before mooring may be utilized to house the usual safety means for maintaining the firing device $w$ of the mine uncocked; this device is housed in the body of the float. This firing device, which may be of the known type in which cocking takes place by rotation, has not been shown in detail. These safety devices which are also known comprise engaging pins $x$ in addition to a counterweight locking device which locks the firing device so long as the mine is in its navigating position. While the counterweight locking device (which is not shown) releases the firing device some seconds after the inversion of the mine the pins $x$ are held in engagement by blocks of salt $x'$ arranged between their shoulders $x^2$ and a stop $x^3$. The melting of these blocks only takes place under the action of the water which after the inversion of the mine has entered the auxiliary reservoir $p$. When the blocks $x'$ have melted the springs $x^4$ press back the pins $x$ and release the firing device $w$.

It should be noted that the safety devices $x$—$x'$ which as stated above are housed in the reservoir $p$ remain efficacious during navigation on the surface or submerged so long as the mine is secured to the deck of the submersible boat and this is so even if the valve $s$ fails to form a perfect joint. The reservoir $p$ would then tend to fill with water but seeing that this reservoir is full of air the submersible would have to descend to a depth of more than 50 meters for the level of the water to rise in the reservoir $p$ to a level with the blocks of salt $x'$.

The automatic ballasting of the anchor after the inversion of the mine is insured in the following manner in the example illustrated (Figs. 5 and 8 to 11). Two water-tight compartments $r$ are fixed in the body $b$ of the anchor each of them being closed by a vertical wall $y$ which supports the passages $z$—$z'$ for the admission of water and the discharge of air and, inside the compartment, the means for obturating these conduits. The obturation is effected by the spring valves 9 and 10 adapted to open outward and respectively shutting off communication between the anchor and the conduit $z$ arranged at the portion of the compartment which occupies the lower position after inversion and the conduit $z'$ which occupies the upper position. The rods of these two valves are pivoted to one and the same operating lever 11—12—12' on either side of the pivot 13 of this lever. The forks 12 of the said lever are engaged in slots 14 provided in a heavy mass 15 which is passed onto a fixed piston 16. This piston is fixed to a bracket 17 on the part 18 in which the conduits $z$ $z'$ and the guides and housings for the valves are formed; the same part carries the bracket 19 a projection from which forms the pivot 13 of the lever 11. At the bottom of the piston housing 16 a passage 20 is provided in the weight 15; this passage is normally closed by a balanced valve 21. A slot 22 opening to the exterior is formed in the weight 15 at the upper part of the housing of the piston and as hereinafter explained serves to establish communication by means of a passage 23 formed in the lower end of the piston between the passage 20 and the exterior. Hammering of the valves 9 and 10 can be prevented during manipulations in the air by means of salt blocks 24 and 25 respectively.

The operation of the mine is as follows: The mines installed upon the deck of the submersible vessel as shown in Figs. 4 and 5 with the anchor upward and then presenting a positive floatability instead of weighting the boat when navigated submerged tend to lighten it. The mooring of a mine can be carried out at any moment without regard to the depth to which the boat is submerged. With this object it is only necessary to draw back the bolt $k$ which retains the mine on deck by opening a cock inside the boat to permit of compressed air supplied from a convenient reservoir to act upon the piston $k'$. The mine on being released rises in overturning approximately about its center of gravity (Fig. 4). This inversion which causes the float $a$ to move from the position shown in Fig. 5 to that shown in Fig. 7 causes the counterweight $t$ to descend and consequently lifts the valve $s$ for automatically admitting the water to the auxiliary reservoir $p$. The floatability of the float and anchor as a whole does not, however, become negative until the reservoir $r$ in the anchor has become partially filled. Prior to mooring when the anchor occupies the position shown in Fig. 5 the pressure of the water is augmented by the tension of the countersprings for maintaining the valves 9 and 10 closed. Finally, the weight of the mass 15 acts upon the forked lever 11—12 and contributes to insuring closure. When the mine has rocked the parts occupy the position shown in Figs. 8 to 11 and the weight 15 then tends to descend in sliding on the fixed piston 16. As, however, the compartments $r$ are full of air and the pressure of this air is exerted upon the valves 21, there is a tendency for a vacuum to be created between the base of the piston 16 and the end of its housing. By this means the fall of the weight 15 is retarded. It takes place slowly until the moment at which the passage 23 opens in front of the slot 22. The equilibrium of pressures then becomes established on both faces of the piston 16 and the weight 15 acts freely upon the forks 12 in bearing upon them by the upper end of the slots 14. The lever 11—12 pivots around the shaft 13 and opens the valves 9 and 10. The water fills the body of the anchor $b$ and enters each compartment through the conduit $z$ while the air is discharged through the conduit $z'$.

The weight 15 should be calculated so as to maintain the valves open as far as a depth of 100 meters for example or any other extreme limit of the sea bottom to which the mine may be moored.

The retardation that the retarded fall of the weight 15 introduces into the opening of the valves is amply sufficient to prevent the floatability from becoming negative before the submersible vessel has been able to move away from the mine. The fall of the immersion regulating weight $d$ is also, in accordance with the invention, retarded for a period greater than that necessary for the submersible to pass beneath the mine; the weight $d$ is therefore unable to commence to unwind its line $f$ and cause the anchor and the float to separate until the submersible has moved away.

The device for retarding the fall of the weight $d$ is represented in detail in Figs. 12 and 13. In a groove formed on the weight which is spherical in form a steel wire line $f$ is wound, one of its ends being attached to the weight and the other to the lever $g$ locking the winch $e$. India rubber lines $f'$ are passed through conduits $d^{10}$ formed in the sphere above and below the groove in which the cable $f$ is wound; these rubber lines are tied at their ends in such a manner that they retain the cable $f$. During the navigation the regulating weight $d$ is maintained in the position shown in Figs. 5 and 12. With this object it is arranged in a depression $b^2$ in the sole of the anchor $b$ and passed by means of an axial cylindrical cavity $d^4$ on a pin $d'$ fixed to the cup $b^2$. The inner head of the pin $d'$ carries a spindle $d^2$ serving as a pivot for two jaws or hooks $d^3$ which so long as they are held together by the walls of the cavity $d^4$ embrace the head $d^5$ of the rod of a piston $d^6$ movable in a cylinder $d^7$ formed at the rear and in line with the cavity $d^4$ from which it is separated by a screwed bottom $d^8$. The cylinder is full of glycerin and longitudinal grooves $d^9$ enable this glycerin to pass from one face of the piston to the other with the desired slowness. As soon as the mine is released and has become inverted, the weight $d$ tends to escape from $b^2$ which has assumed the position shown in Fig. 13 but the fall is retarded by reason of the slowness with which the glycerin passes from the upper face of the piston $d^6$ toward the lower face. The weight only falls freely from the moment at which the hooks $d^3$ have left the cavity $d^4$. The cable $f$ in becoming taut then breaks the connections $f'$. When the line $f$ has unwound, the anchor $b$ separates from the float $a$ and the mooring takes place in the usual manner explained above with reference to Figs. 2 and 3.

What I claim and desire to secure by Letters Patent of the United States is:—

1. In a submarine mine adapted to be moored from the deck of a submarine boat while under water, the combination of a float, an anchor and a regulating weight normally superimposed in the inverse order named while on deck and flexible connections for the parts, the whole being floatable while in normal position.

2. In a submarine mine adapted to be moored from the deck of a submarine boat while under water, the combination of a float, an anchor and a regulating weight, normally superimposed in the inverse order named while on deck, flexible connections for the parts, means for changing the floatability of one or more of said parts operable on inversion of the mine, the whole being floatable while in normal position.

3. In a submarine mine adapted to be moored from the deck of a submarine boat while under water, the combination of a float, an anchor and a regulating weight, normally superimposed in the inverse order named while on deck, flexible connections for the parts, means for changing the floatability of one or more of said parts operable on inversion of the mine and means for retarding the action of the last named means, the whole being floatable while in normal position.

4. In a submarine mine adapted to be moored from the deck of a submarine boat while under water, the combination of a float, an anchor and a regulating weight normally superimposed in the inverse order named while on deck and flexible connections for the parts, the whole being floatable while in normal position, said float and anchor each having an air reservoir provided with a valve controlled water passage adapted to be closed while the parts are in normal position and to open when the parts are inverted for admission of water to said reservoirs for the purpose described.

5. In a buoyant mine, the combination of firing device, a float provided with an auxiliary air chamber having a valve-controlled water passage, means controlled by a water soluble member housed in said chamber and adapted to maintain the firing device in inoperative position while said valve-controlled water passage is closed and to release said device when said member dissolves by water entering said chamber.

6. In a submarine mine adapted to be moored from the deck of a submarine boat while under water, the combination of a float, an anchor and a regulating weight normally superimposed in the inverse order named while on deck and flexible connections for the parts, the whole being floatable while in normal position, said anchor having a ballast chamber provided with valve controlled water inlet and air outlet passages, means for opening said valves when the mine inverts in the water and means for delaying action of said means.

7. In a submarine mine adapted to be moored from the deck of a submarine boat while under water, the combination of a float, an anchor and a regulating weight normally superimposed in the inverse order named while on deck and flexible connections for the parts, and means retarding the face of said regulating weight, the whole being floatable while in normal position In testimony whereof I have signed this specification in the presence of two subscribing witnesses.

CHARLES PIERRE JULES CARTERON.

Witnesses:
LOUIS FAUTRAT,
LUCIEN MEMMINGER.